UNITED STATES PATENT OFFICE.

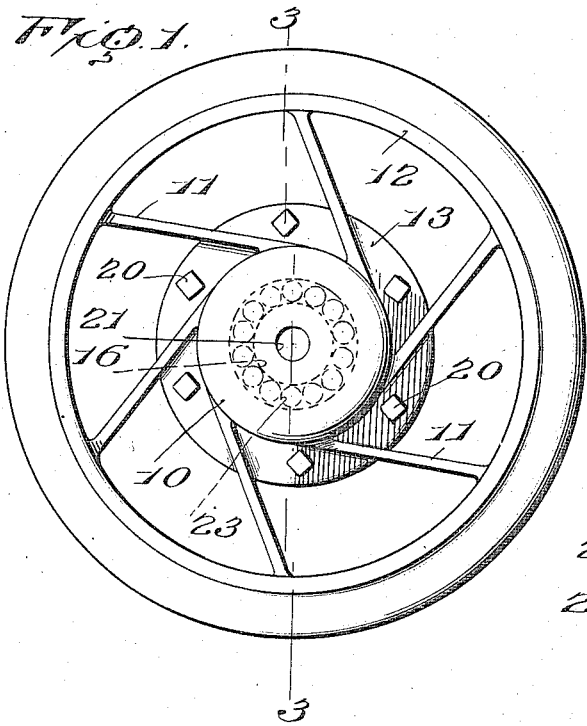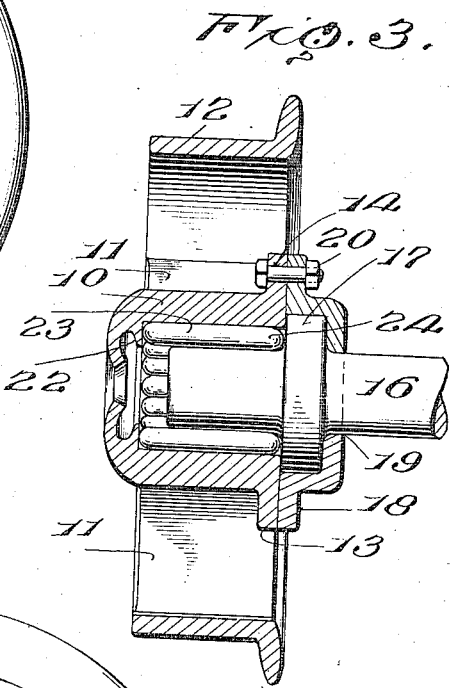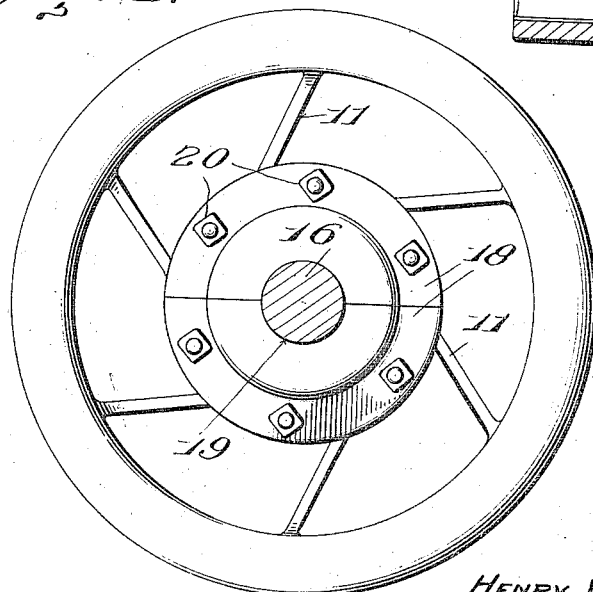

HENRY W. E. BROSI, OF GIRARD, KANSAS.

MINE-CAR WHEEL.

1,296,914.  Specification of Letters Patent.  Patented Mar. 11, 1919.

Application filed November 2, 1918. Serial No. 260,877.

*To all whom it may concern:*

Be it known that I, HENRY W. E. BROSI, a citizen of the United States, residing at Girard, in the county of Crawford, State of Kansas, have invented certain new and useful Improvements in Mine-Car Wheels; and I do hereby declare the following to be a full, clear, and exact description of the invention, such as will enable others skilled in the art to which it appertains to make and use the same.

This invention relates to new and useful improvements in car wheels and particularly to mine car wheels.

One object of the present invention is to provide a novel and improved structure of this character whereby the lubricant is properly prevented from escaping and running along the axle.

Another object is to provide a novel and improved structure of this character whereby the end thrust of the axle through the hub of the wheel will be prevented from any great friction.

Other objects and advantages will be apparent from the following description when taken in connection with the accompanying drawing.

In the drawing:

Figure 1 is an elevation of a wheel made in accordance with my invention and view from the outer end of the axle.

Fig. 2 is an elevation of the wheel view from the other side, the axle being shown in section.

Fig. 3 is a vertical sectional view taken on the line 3—3 of Fig. 1.

Referring particularly to the accompanying drawing the wheel includes the hub 10, from which radiate a plurality of spokes 11, said spokes being connected, at their outer ends, to the rim 12. Formed integrally on the inner end of the hub, and extending circumferentially therearound, is a flange 13 formed with a circular series of openings 14. The center of the hub is formed with an opening 15 for the reception of the end of the axle 16. Formed integrally on the axle, inwardly of the wheel hub, and bearing against the inner end of the hub, is a peripheral rib or flange 17. A cap plate 18 is formed with a central opening 19 through which the axle is disposed, and said plate is secured to the flange 13, by bolts 20 which are passed through openings in the plate and the openings in the flange 13. The portion of the plate which surrounds the central opening 19 is offset so as to receive the flange or rib 17 of the axle therewithin, and hold the said rib against the adjacent end of the hub.

The outer end of the hub is closed, except for the central opening 21 through which oil is introduced into the interior of the hub. The axle terminates a short distance inwardly of the outer end of the hub, and this closed end of the hub is formed with an inwardly extending vertical flange 22, the purpose of which is to serve as a stop for the outward thrust of the circular series of roller bearings 23, which are arranged around the axle, and within the hub. The opposite ends of these bearings are rounded, as shown at 24, their rear ends bearing against the flange or rib 17 of the axle. Thus the end thrust of the axle, in both directions, will be limited and prevented from great friction by the roller bearings abutting against the flanges.

It will be noted that the cap plate 18 is formed in two sections whereby the same may be easily and quickly applied or removed while the axle is within the wheel, and thus rendering the removal of the wheel easy.

The inner face of the outer end wall of the hub, and surrounding the oil opening, is formed with a groove which retains the lubricant, while a space is provided between said wall and the adjacent end of the axle for the supply of lubricant.

What is claimed is:—

1. A wheel including a hub having one end closed save for an opening for lubricating, a removable cap plate detachably secured on the other end of the hub and having an offset portion spaced from the hub and provided with an axle receiving opening, and antifriction members disposed in the hub and having their ends arranged for contact with a portion of an axle and one end of the hub.

2. A wheel including a hub having a central bore, reduced at one end, with a resultant shoulder, an axle having one end disposed within the bore and provided with a circumscribing flange, lying exteriorly of the hub, a cap detachably secured to one end of the hub, encircling the flange of the axle and extending inwardly beyond the periphery of the flange, in encircliig relation to the axle, and antifriction members disposed between the wall of the hub bore and the received end of the axle and bearing against the flange and the shoulder of the bore.

In testimony whereof, I affix my signature, in the presence of two witnesses.

HENRY W. E. BROSI.

Witnesses:
  WILLIAM C. LEMLER,
  C. A. HITZ.